US006874745B1

(12) United States Patent
Bean

(10) Patent No.: US 6,874,745 B1
(45) Date of Patent: Apr. 5, 2005

(54) DEVICE TO SECURE A JACK PAD

(76) Inventor: Bruce L. Bean, 872 S. 400 West, Burley, ID (US) 83318

( * ) Notice: Subject to any disclaimer, the term of this patent is extended or adjusted under 35 U.S.C. 154(b) by 0 days.

(21) Appl. No.: 10/700,566

(22) Filed: Nov. 5, 2003

(51) Int. Cl.[7] .............................................. B65D 19/00
(52) U.S. Cl. ................................... 248/346.01; 410/30
(58) Field of Search ....................... 248/346.01, 346.4, 248/346.5, 346.11; 280/475, 476.1, 763.1; 410/30, 49

(56) References Cited

U.S. PATENT DOCUMENTS

| 1,554,327 | A | * | 9/1925 | Boberg ................... 248/346.11 |
| 2,931,463 | A | | 4/1960 | Stansbury .................... 188/32 |
| 3,219,362 | A | | 11/1965 | Epstein .................... 280/763.1 |
| 3,329,402 | A | | 7/1967 | Grumman ................... 254/420 |
| 3,970,278 | A | * | 7/1976 | Studer ......................... 248/352 |
| 4,254,927 | A | | 3/1981 | Stonhaus .................... 248/346 |
| 4,461,491 | A | | 7/1984 | Eklund |
| 4,548,418 | A | * | 10/1985 | Wendorff ....................... 280/1 |
| D304,575 | S | | 11/1989 | Batzel ......................... D34/31 |
| 4,911,460 | A | * | 3/1990 | DePaula .................. 280/478.1 |
| 5,009,444 | A | | 4/1991 | Williams, Jr. ............... 254/420 |
| 5,046,587 | A | | 9/1991 | Jones ........................... 188/32 |
| D321,498 | S | | 11/1991 | Jones ........................ D12/217 |
| 5,332,066 | A | | 7/1994 | Pickeral ....................... 188/32 |
| 5,383,639 | A | | 1/1995 | Byard ..................... 248/346.1 |
| D357,650 | S | | 4/1995 | Evans et al. ............... D12/106 |
| 6,742,752 | B1 | * | 6/2004 | Fenyves et al. ........ 248/346.02 |

FOREIGN PATENT DOCUMENTS

GB 1029626 5/1966

* cited by examiner

Primary Examiner—Leslie A. Braun
Assistant Examiner—A. Joseph Wujciak
(74) Attorney, Agent, or Firm—Richard C. Litman

(57) ABSTRACT

The device to secure a jack pad is a device for supporting the jack of a trailer so that the jack does not sink into the ground when it is not being used. The device receives and supports trailer jacks having various configurations so that one device may be used with a number of differently configured trailer jacks. The trailer jack support comprises a unitary body having an upper portion and a lower portion. A number of differently configured jack receiving cutouts are disposed on the top surface. A center support member extends downwardly from the bottom surface of the upper portion and supports the majority of the weight of the trailer jack. A plurality of stabilizing projections extends downward from the upper portion of the device.

20 Claims, 4 Drawing Sheets

DEVICE TO SECURE A JACK PAD

BACKGROUND OF THE INVENTION

1. Field of the Invention

The present invention relates to a device for stabilizing a trailer jack on soft ground after the trailer has been disconnected from its towing vehicle, and more particularly to a to a stabilizing device that can receive a wheel, a jack pad or the shaft of a jack.

2. Description of the Related Art

Trailers normally provide a tongue means or a jack located at the forward end of the trailer for securing the trailer to the rearward end of a towing vehicle. When the trailer is not in use it is typically removed from its towing vehicle and left in a storage position. While in the storage position the jack of the trailer is positioned on the ground. If the jack is positioned on other than firm ground the jack will settle into the ground. The settlement occurs because jacks normally occupy a small concentrated area so that all of the weight of the trailer is forced upon the ground in a small area resulting in a very high force per square inch. The high force causes the jack to settle.

It is common to place plates or boards underneath the jack to distribute the force being applied to the ground by the trailer. These plates often bend or break and also allow relative movement between the jack and the plate, which causes sliding of the trailer. Devices have been created that distribute the force from the trailer jack while also preventing sliding of the trailer. These devices, however, are often designed for receiving either a trailer jack, a jack with a wheel on the bottom of the jack or a jack having a jack pad secured to the bottom of the jack. This requires having several different support devices depending on the current configuration of the trailer jack.

The following patent documents disclose devices for supporting a trailer jack while the trailer is disconnected from its towing vehicle.

U.S. Design Pat. No. 304,575 issued on Nov. 14, 1989 to Batzel, U.S. Design Pat. No. 321,498 issued on Nov. 12, 1991 to Jones and U.S. Design Pat. No. 357,650 issued on Apr. 25, 1995 to Evans et al. each disclose ornamental designs for trailer jack support pads.

U.S. Pat. No. 2,931,463 issued on Apr. 5, 1960 to Stansbury discloses a trailer tongue wheel chock. The wheel chock comprises a substantially rectangular plate of metal for supporting the tongue wheel. The plate includes a rectangular opening for receiving the trailer tongue wheel. Each corner of the plate is adapted for receiving a threaded anchoring spike. The spikes secure the plate into the ground.

U.S. Pat. No. 3,219,362 issued on Nov. 23, 1965 to Epstein discloses a flexible landing gear foot. The landing gear foot comprises an upper metallic plate and a lower or ground engaging plate and a resilient member disposed therebetween. A generally pyramid shaped metal support bracket with an open top for receiving the leg of a trailer landing gear unit is secured to the top of the upper plate.

U.S. Pat. No. 3,329,402 issued on Jul. 4, 1967 to Grumman discloses a jack base for trailers. The jack base comprises a conical casting member. The base of the casting has a wide supporting surface and reinforcing ribs that extend between the supporting surface and the sides of the conical casting. There is a hole in the top of the casting member for receiving the shaft of a trailer jack.

U.S. Pat. No. 4,254,927 issued on Mar. 10, 1981 to Stonhaus discloses a jacking plate for a trailer. The plate has a generally square shaped main body. The jacking plate further comprises a plurality of reinforcing flanges that are integrally formed to the plate for distributing the load of the trailer and for preventing the plate from breaking. The jacking plate is adapted for receiving three common types of jacks, which include square based jacks, pivot point jacks and trailer jack wheels.

U.S. Pat. No. 4,461,491 issued on Jul. 24, 1984 to Eklund discloses trailer sand shoes. The sand shoe comprises a rectangular metal base plate and upstanding sides fixed to the base plate. The central portions of the side plates have openings for mounting the sand shoe to the legs of a trailer. The base plate includes an integral reinforcing member that extends between the side plates and is formed from the base plate.

U.S. Pat. No. 5,009,444 issued on Apr. 23, 1991 to Williams, Jr. discloses a slideable jack stand. The device includes a jack shaft receiving socket mounted to a ground engaging support. The support is slidable on low friction surface, which allows the jack shaft to be shifted to perfect alignment with the trailer hitch.

U.S. Pat. No. 5,046,587 issued on Sep. 10, 1991 to Jones discloses a trailer tongue wheel chock and support. The wheel chock comprises a base portion with upwardly sloping sides portions extending from the periphery of the base. A receiving portion is located on a flat top surface that is disposed on the top of the sloped side portions. The slope side portions allow a wheel to approach and engage the receiver around the entire periphery of the base portion.

U.S. Pat. No. 5,332,066 issued on Jul. 26, 1994 to Pickeral discloses a boat trailer rest. The boat trailer rest comprises a base with a plurality of side walls extending upwardly from the base and terminating at a top portion. A cradle portion is disposed in the top portion and is adapted for receiving a jack wheel.

U.S. Pat. No. 5,383,639 issued on Jan. 24, 1995 to Byard discloses an apparatus for securing a shopping cart wheel. The device comprises a base portion with upwardly sloping sides portions extending from the periphery of the base. A receiving portion is located on a flat top surface that is disposed on the top of the sloped side portions. The slope side portions allow a wheel to approach and engage the receiver around the entire periphery of the base portion.

United Kingdom Patent Application published on May 18, 1966 discloses a support ring for round bottomed vessels. The device comprises a top portion having a center hole that is circular to support a vessel having a round bottom. The center hole conforms to the shape of the vessel bottom. The device has a base portion for supporting the round bottom vessel while it is inside of the top portion.

None of the above inventions and patents, taken either singly or in combination, is seen to describe the instant invention as claimed. Thus a device to secure a jack pad solving the aforementioned problems is desired.

SUMMARY OF THE INVENTION

The device to secure a jack pad is a device for supporting the jack of a trailer. The device is designed to receive and support trailer jacks having various configurations so that one jack support device may be used with a number of differently configured trailer jacks. The trailer jack support has a unitary body that is made from a lightweight material. The trailer jack support distributes the weight from the trailer jack so that the trailer jack does not sink into the ground while it is not being used.

The trailer jack support comprises a unitary body having an upper portion and a lower portion. The upper portion of the support receives the trailer jack and the lower portion supports and distributes the weight of the trailer jack. The upper portion has a top surface and a bottom surface. A number of jack receiving cutouts are disposed on the top surface for receiving differently configured trailer jacks. A center support member extends downwardly from the bottom surface of the upper portion. The center support member supports the majority of the weight of the trailer jack. A plurality of stabilizing projections extends slopingly downward from the upper portion of the device. The projections further distribute the weight of the trailer jack and allow the trailer jack support to stand freely.

Accordingly, it is a principal object of the invention to provide a trailer jack support that prevents a trailer jack from sinking into the ground when the trailer is not in use.

It is another object of the invention to provide a trailer jack support that is capable of receiving and supporting a plurality of differently configured trailer jacks using a single device.

It is a further object of the invention to provide a trailer jack support that prevents the trailer jack from being damaged during storage of the trailer.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
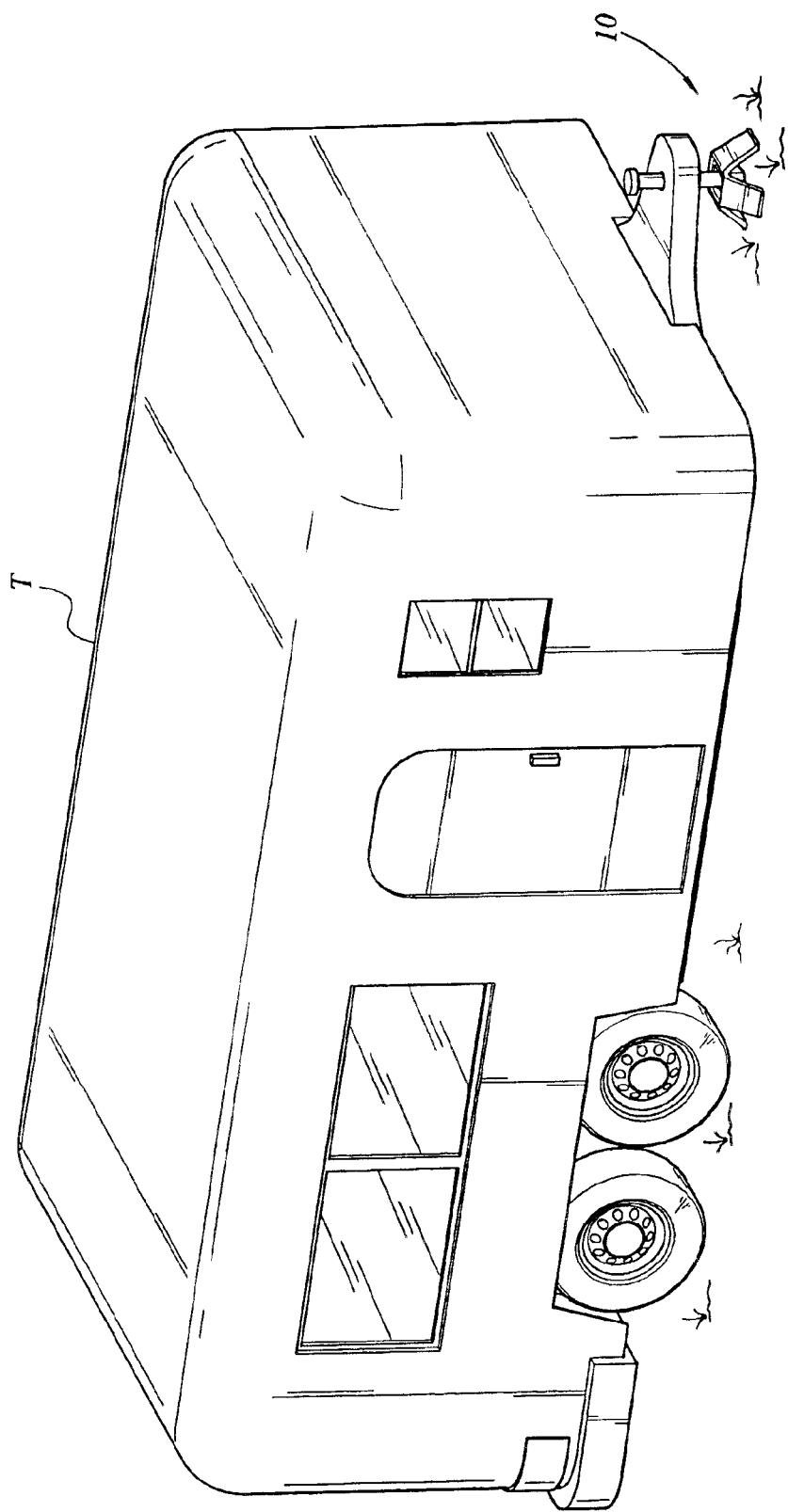
FIG. 1 is an environmental, perspective view of a device to secure a jack pad according to the present invention.

The present invention is a device for securing a trailer jack when the trailer is not being used with a towing vehicle. When a trailer is not in use a trailer jack is used to support the towing end of the trailer. The weight of the trailer on the trailer jack often causes the trailer jack to sink or settle into the ground if the ground that the trailer is being stored on is soft. FIG. 1 is an environmental, perspective view of the trailer jack support 10 secured to the jack of a camper trailer T according to a preferred embodiment of the present invention. The camper trailer T is only used as an example of a possible application for the trailer jack support 10. The trailer jack support 10 may also be used with a boat trailer, a horse trailer, a utility trailer or any other known trailer device using a trailer jack for supporting the trailer while it is being stored.

Figure 2:
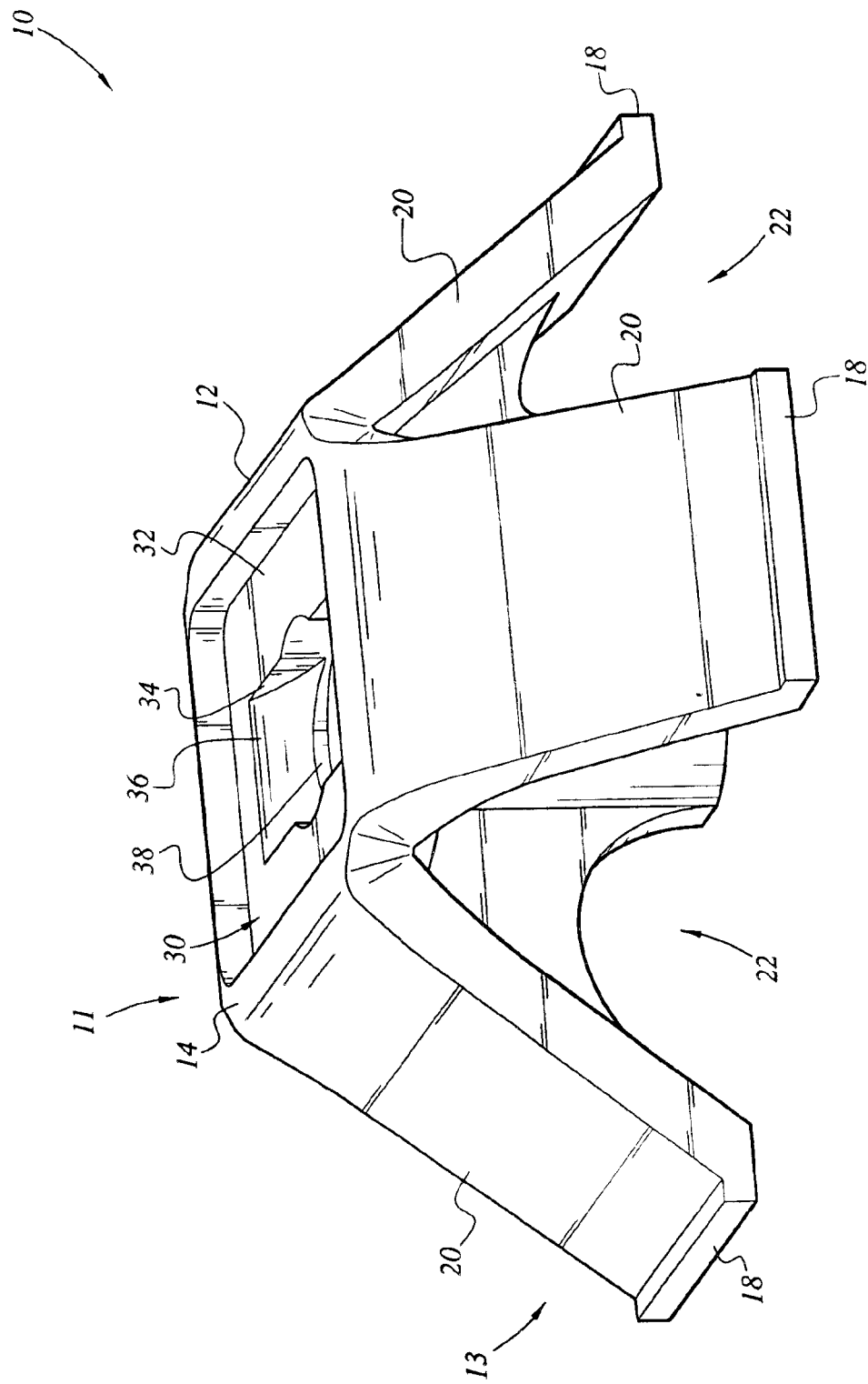
FIG. 2 is a side perspective view of the device to secure a jack pad.
Figure 3:
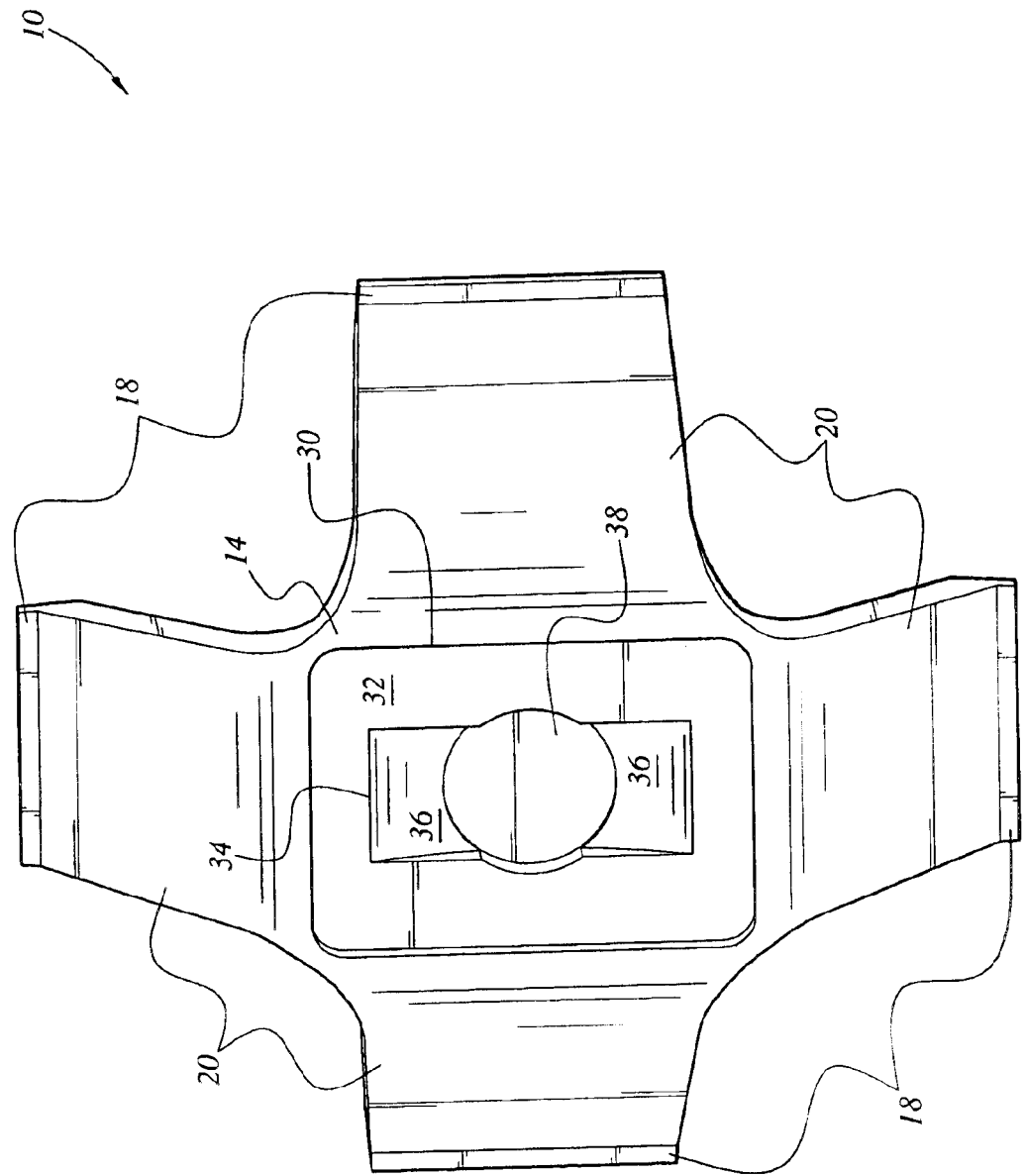
FIG. 3 is a top view of the device to secure a jack pad.

FIG. 2 is a perspective view of the trailer jack support 10. The present trailer jack support 10 is capable of receiving and supporting a number of differently configured trailer jacks. Trailer jacks are commonly configured in three different ways. The trailer jack comprises a shaft that extends towards the ground. The shaft may rest on the ground on its own, or it may have a wheel or a jack pad secured to the end of the shaft contacting the ground. The present trailer jack support 10 is capable of receiving a trailer jack shaft, jack wheel or jack pad.

The trailer jack support 10 comprises a unitary body 11 having an upper portion 12 and a bottom portion 13. The upper portion 12 is generally rectangular and has a top surface 14 and a bottom surface 16 (shown in FIG. 16). A plurality of jack receiving cutouts is disposed on the top surface 14 of the trailer jack support 10. Each jack receiving cutout is adapted for receiving a different configuration of the trailer jack.

A plurality of sloping projections 20 extends downward at an angle from the upper portion 12 of the trailer jack support 10. The plurality of projections 20 preferably comprises four projections, where each projection 20 extends from one side of the generally rectangular upper portion 12. The sloping projections 20 define the lower portion 13 of the trailer jack support 10. A support foot portion 18 is disposed along the bottom of each sloping projection 20. The foot portions 18 define a base that extends around the bottom of the lower portion 13. The foot portions 18, in combination with the projections 20, allow the trailer jack support 10 to stand freely and to distribute the weight from the trailer jack. Each foot portion 18 has a flat bottom surface 19 (shown in FIG. 4) that allows the trailer support jack 10 to sit flat and secure on the ground.

In the preferred embodiment of the trailer jack support 10 the plurality of jack receiving cutouts comprises three distinct cutouts. The plurality of cutouts preferably comprises a jack pad cutout 30., a jack wheel cutout 34 and a jack shaft cutout 38. The trailer jack support 10 is not limited to comprising all three of the jack receiving cutouts. The trailer jack support 10 may be designed with only one of the cutouts listed above. Also, the trailer jack support 10 may be designed with any two of the cutouts listed above. The preferred embodiment of the trailer jack support 10 comprises all three cutouts so that a single support 10 may be used with any trailer jack.

The jack pad receiving cutout 32 is disposed along the top surface 14 of the upper portion 12 of the trailer jack support 10. The jack pad cutout 30 is adapted for receiving a trailer jack that is equipped with a jack pad on the bottom of the trailer jack. The jack pad cutout 30 has a generally rectangular opening and a generally rectangular flat bottom surface 32 that is positioned slightly lower than the top surface 14 of the upper portion 12. The jack pad cutout 30 receives the jack pad and allows it to rest flat on the jack support 10.

The jack wheel receiving cutout 34 is disposed on the top surface 14 of the upper portion 12 of the trailer jack support 10. The jack wheel cutout 34 is positioned in the center of the jack pad cutout 30. The jack wheel cutout 34 has a generally rectangular top opening adapted for receiving a wheel secured to the bottom of a trailer jack. The jack wheel cutout 34 has a generally crescent shaped bottom surface 36. The generally crescent shaped bottom surface 36 conforms to the curvature of a typical jack wheel. The generally crescent shaped bottom surface 36 descends lower than the surface 32 of the jack pad cutout 32 so that the jack wheel will securely rest inside of the upper portion 12 of the trailer jack support 10.

The jack shaft cutout 38 is adapted to receive the shaft of a trailer jack. The shaft cutout 38 is disposed on the top surface of the upper portion 12 of the trailer jack support 10. The shaft cutout 38 is positioned in the center of the trailer jack support 10 and the center of the jack wheel cutout 34.

Figure 4:
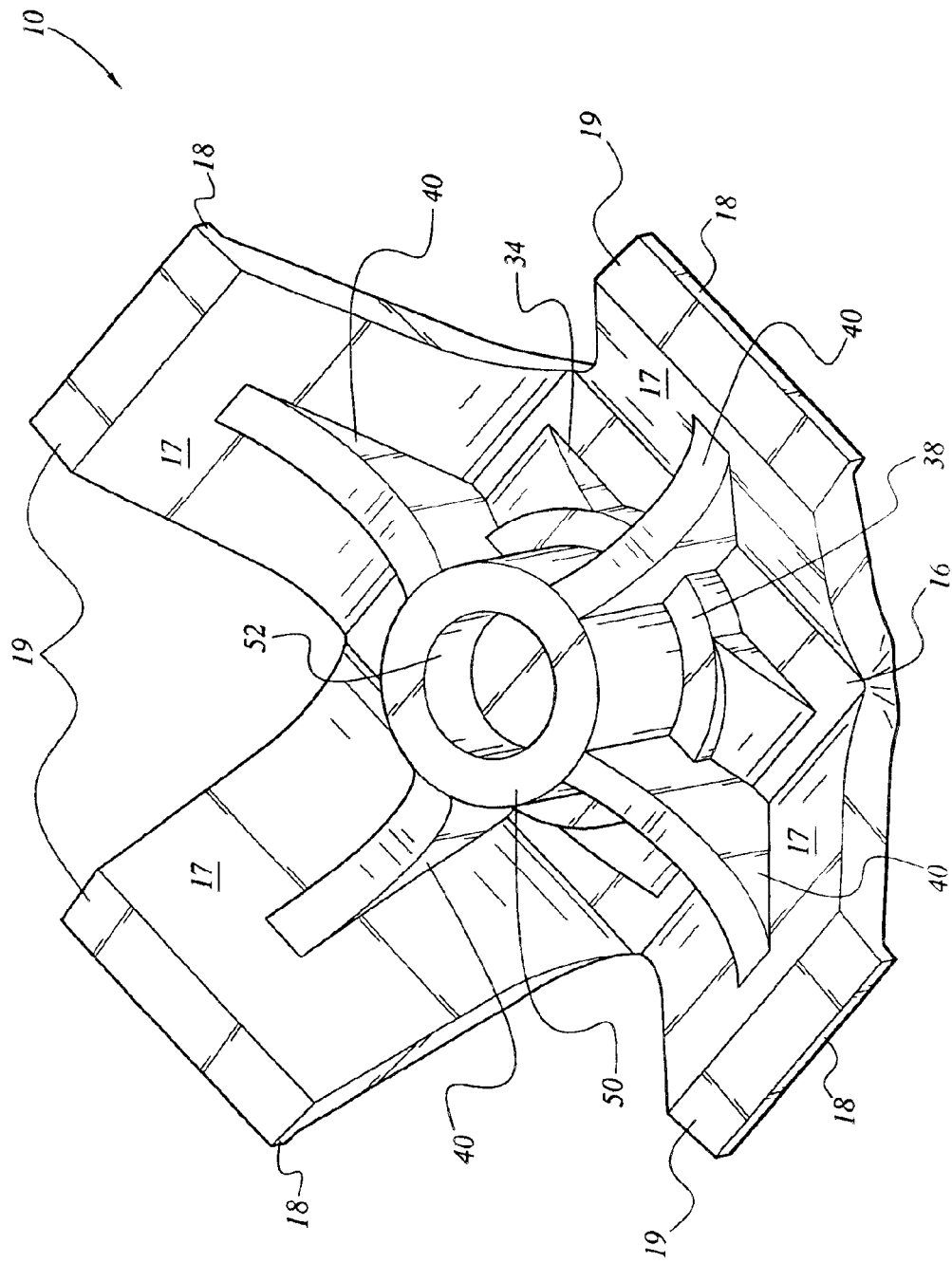
FIG. 4 is a bottom perspective view of the device to secure a jack pad.

FIG. 4 is a bottom perspective view of the trailer jack support 10. A center support member 50 extends downwardly from the bottom surface 16 of the upper portion 12 of the jack support 10. The center support member is generally cylindrical with a circular, hollow center portion 52. The center support member 50 supports the majority of the weight of the trailer jack. In accordance with a preferred embodiment of the present invention, the center support member 50 supports over 80 percent of the weight from the trailer jack. The remainder of the weight from the trailer jack is distributed by the projections 20.

The trailer jack support 10 further comprises a plurality of projection supports 40 for the projections 20. The projection supports 40 have curved main body portions and are adapted for supporting the projections 20 while they are supporting the weight from the trailer jack 10. The projection supports 40 each have a first end secured to one of the projections 20 and a second end secured to the center support member 50.

According to a preferred embodiment of the present invention, the trailer jack support has a height of six inches at its center. The trailer jack is not limited to this height and may be designed any height that is suitable to keep the trailer jack from extending into the ground.

The trailer jack support 10 is preferably made from a light weight material. According to the preferred embodiment of the present invention the trailer jack support 10 is made from a lightweight recycled plastic material. The trailer jack support 10 is not limited to being made from recycled plastic. The trailer jack support 10 may be made from any lightweight material with suitable strength to support a trailer jack without fracturing under the weight from the trailer T.

It is to be understood that the present invention is not limited to the embodiment described above, but encompasses any and all embodiments within the scope of the following claims.

I claim:

1. A trailer jack support, comprising:
   a unitary member having a lower portion and an upper portion with a top surface and a bottom surface;
   a plurality of outwardly sloping projections extending downwardly from said upper portion of said unitary member defining said lower portion, each sloping projection having a top end and a bottom end;
   a plurality of jack receiving cutout portions disposed on said top surface, each jack receiving cutout adapted for receiving a different jack configuration; and
   a center support member projecting downwardly from said bottom surface for supporting a portion of the weight from the trailer jack;
   whereby said trailer jack is adapted for receiving a number of differently configured trailer jacks without having to use a number of different jack supports and is designed for distributing and supporting the weight of the trailer to prevent the trailer jack from sinking into the ground.

2. The trailer jack support according to claim 1, further comprising a plurality of weight displacing support portions disposed along the bottom ends of said sloping projections, said support portions defining a base portion.

3. The trailer jack support according to claim 1, wherein one of said jack receiving cutout portions comprises a jack pad receiving cutout.

4. The trailer jack support according to claim 3, wherein said jack pad receiving cutout comprises a generally rectangular cutout.

5. The trailer jack support according to claim 1, wherein one of said jack receiving cutout portions comprises a jack wheel receiving cutout.

6. The trailer jack support according to claim 5, wherein said jack receiving cutout comprises a generally rectangular upper opening and a crescent shaped bottom surface.

7. The trailer jack support according to claim 1, wherein one of said jack receiving cutout portions comprises a jack shaft receiving cutout.

8. The trailer jack support according to claim 7, wherein said jack shaft receiving cutout comprises a generally circular cutout.

9. The trailer jack support according to claim 1, further comprising a plurality of projection members disposed along said bottom surface, each of said projection support members having a first end secured to one of said sloping projections and a second end secured to said center support member.

10. The trailer jack according to claim 1, further comprising a support ring disposed around said center support member.

11. The trailer according to claim 1, wherein said trailer has a height of six inches.

12. The trailer jack support according to claim 1, wherein said trailer jack support is made from a lightweight plastic material.

13. The trailer jack support according to claim 1, further comprising a plurality of separations disposed between each of said sloping projections.

14. A trailer jack support comprising:
   a unitary member having a lower portion and an upper portion with a top surface and a bottom surface;
   a plurality of outwardly sloping projections extending downwardly from said upper portion of said unitary member defining said lower portion, each sloping projection having a top end and a bottom end;
   a plurality of jack receiving cutout portions disposed on said top surface, each jack receiving cutout adapted for receiving a different jack configuration, said plurality of jack receiving cutouts comprising a generally rectangular jack pad receiving cutout, a generally circular jack shaft receiving cutout and a jack wheel receiving cutout having a generally rectangular top opening and a crescent shaped bottom surface; and
   a center support member projecting downwardly from said bottom surface for supporting a portion of the weight from the trailer jack;
   whereby said trailer jack is adapted for receiving a number of differently configured trailer jacks without having to use a number of different jack supports and is designed for distributing and supporting the weight of the trailer to prevent the trailer jack from sinking into the ground.

15. The trailer jack support according to claim 14, further comprising a plurality of weight displacing support portions disposed along the bottom ends of said sloping projections, said support portions defining a base portion.

16. The trailer jack support according to claim 14, further comprising a plurality of projection members disposed along said bottom surface, each of said projection support members having a first end secured to one of said sloping projections and a second end secured to said center support member.

17. The trailer jack according to claim 14, further comprising a support ring disposed around said center support member.

18. The trailer according to claim 14, wherein said trailer has a height of six inches.

19. The trailer jack support according to claim 14, wherein said trailer jack support is made from a lightweight plastic material.

20. The trailer jack support according to claim 14, further comprising a plurality of separations disposed between each of said sloping projections.

* * * * *